US006922295B2

(12) United States Patent
Glassburn et al.

(10) Patent No.: US 6,922,295 B2
(45) Date of Patent: Jul. 26, 2005

(54) LENS ASSEMBLY WITH INTEGRATED FOCUS MOUNT AND CRT COUPLER

(75) Inventors: Robin S. Glassburn, Batavia, OH (US); E. Gregory Fulkerson, Amelia, OH (US); Michael B. Larson, Georgetown, OH (US); David M. Snively, Cincinnati, OH (US); Donald Lee Keyes, Mariemont, OH (US); Brian L. Dawes, Batavia, OH (US); Daniel G. Meiser, Butler, KY (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/665,950

(22) Filed: Sep. 19, 2003

(65) Prior Publication Data

US 2005/0063073 A1 Mar. 24, 2005

(51) Int. Cl.[7] .............................. G02B 7/02; H04N 3/22
(52) U.S. Cl. ........................ 359/819; 359/820; 359/821; 348/745; 348/746
(58) Field of Search ................................. 359/819, 820, 359/821, 811, 649, 713, 650, 651, 756; 348/745, 746; 313/36

(56) References Cited

U.S. PATENT DOCUMENTS

| 4,388,642 A | 6/1983 | Reno, Jr. et al. .............. 546/14 |
| 4,404,588 A | 9/1983 | Fanizza et al. .............. 348/745 |
| 4,621,293 A | 11/1986 | Matis ........................ 348/745 |
| 5,045,930 A | 9/1991 | Hasegawa ................... 348/746 |
| 5,157,554 A | 10/1992 | Kashihara ................... 359/820 |
| 5,298,984 A | 3/1994 | Numata ...................... 348/778 |
| 5,371,628 A | 12/1994 | Shimoda et al. ............. 359/649 |
| 5,471,111 A | 11/1995 | Kim ........................... 313/36 |
| 5,521,459 A | 5/1996 | Kim ........................... 313/36 |
| 5,587,838 A | 12/1996 | Kasihara ..................... 359/649 |
| 5,731,917 A | 3/1998 | Inoue ......................... 359/820 |
| 5,812,215 A | 9/1998 | Yamada et al. ............. 348/825 |
| 5,877,583 A * | 3/1999 | Meglio et al. ................ 313/35 |
| 5,892,627 A | 4/1999 | Duggan ....................... 359/802 |
| 6,115,082 A | 9/2000 | Rudolph ...................... 348/749 |
| 6,239,917 B1 | 5/2001 | Tadic-Galeb et al. ........ 359/663 |
| 6,441,976 B1 | 8/2002 | Okorocha ................... 359/820 |
| 6,552,859 B1 | 4/2003 | Matsumoto et al. ......... 359/738 |
| 6,696,776 B2 * | 2/2004 | Florek ......................... 313/35 |
| 2002/0024639 A1 | 2/2002 | Jung ........................... 353/74 |
| 2002/0054246 A1 | 5/2002 | Hong .......................... 348/749 |
| 2002/0140332 A1 | 10/2002 | Florek ......................... 313/35 |
| 2004/0212904 A1 * | 10/2004 | Sekine et al. ............... 359/819 |

FOREIGN PATENT DOCUMENTS

GB          528685          11/1940

* cited by examiner

Primary Examiner—Timothy Thompson
(74) Attorney, Agent, or Firm—George W. Jonas

(57) ABSTRACT

A lens assembly adapted to be connected to a CRT and affixed to mounting structure in a projection television cabinet. The lens assembly includes a tubular lens mount having a longitudinal axis and at least a first optical lens element mounted along the longitudinal axis. A tubular focus mount extends along the longitudinal axis and fastening and locking structure connects the lens mount to the focus mount after a focus mount position is obtained. A CRT coupler is formed integrally with the focus mount and includes structure for securing a CRT and for securing the coupler to the mounting structure within the television cabinet. A second optical lens element is mounted to the CRT coupler. A flexible bladder may be used to contain coolant fluid between the CRT and the coupler.

54 Claims, 17 Drawing Sheets

LENS ASSEMBLY WITH INTEGRATED FOCUS MOUNT AND CRT COUPLER

FIELD OF THE INVENTION

The present invention generally relates to lens assemblies used to project images onto projection television screens and, more particularly, to the manner of assembling and mounting such lens assemblies or systems within the cabinet of the projection television.

BACKGROUND OF THE INVENTION

Projection televisions typically use cathode ray tubes (CRTs) which display an image on a glass faceplate. That image is projected through a coupler and lens assembly onto a screen of the television. The coupler is typically formed as a separate component of die cast aluminum and serves to couple the CRT to the lens assembly and also to secure the coupler/lens assembly as a unit to appropriate mounting structure within the television cabinet. In rear projection type televisions, three such CRT units are used to project the same image in the three primary colors onto a mirror with the image being reflected and magnified onto the viewing screen.

A "C" lens of the lens assembly is mounted to a side of the coupler opposite to the CRT. As each of the three CRT's in a projection television most often operate at maximum power so as to maximize light intensity at the CRT faceplate, and as each CRT is located within the confines of a projection television cabinet, considerable heat is generated in the vicinity of each CRT. Such heat can have undesirable effects on the lens assembly, such as changes in the focus of the lens assembly. This can lead to significant image distortions on the television screen. In addition, such heat can lead to extreme temperature gradients on faceplate of CRT possibly causing a shortened CRT life. Therefore, a liquid coolant, such as an ethylene glycol/glycerin coolant, is contained between the "C" lens and the CRT faceplate in a sealed space defined within the die cast aluminum coupler to provide a more uniform temperature on the CRT faceplate. An additional benefit of filling the volume between CRT faceplate and "C" lens with this liquid is to improve the contrast of the lens system. The coupler may be coated with a nonreflective dark finish, such as a black paint or other coating to improve contrast by reducing light reflections and to prevent corrosion of the aluminum casting.

Various problems or drawbacks with current systems utilizing separate die cast aluminum couplers include the increased number of parts and increased assembly. In addition, the use of increased numbers of components in the overall assembly necessarily leads to an increase in tolerance stack up and, therefore, less overall dimensional accuracy in the assembled product. In the case of a lens and CRT assembly for use in a projection television this may lead to additional distortion in the image projected onto the television screen. Another disadvantage in using a CRT coupler with nonreflective surface finish such as black paint or other coating is that this finish can flake off into the coolant fluid and degrade the image performance of the lens system. Another disadvantage in the current system is the need to perform a secondary machining process to the sealing areas of the coupler due to the rough surface finish of a die cast part. Still another disadvantage is the fact that the coupler does not contain any way to rotationally orient the "C" lens element. This is a common practice done manually during the assembly process.

SUMMARY OF THE INVENTION

The present invention generally relates to a lens assembly adapted to be connected to a CRT and fixed to mounting structure in a projection television cabinet. The lens assembly includes a tubular lens mount having a longitudinal axis and at least a first optical lens element mounted therein along the longitudinal axis. A tubular focus mount extends along the longitudinal axis and adjustable fastening and locking structure connects the lens mount to the focus mount in a manner which allows a focus position to be obtained and locked in place between the lens mount and the focus mount. A CRT coupler is formed integrally with the focus mount and includes CRT fastening structure for securing the CRT thereto and projection television fastening structure for securing the CRT coupler to mounting structure within the projection television cabinet. A second optical lens element is mounted to the CRT coupler.

Preferably, the focus mount and the CRT coupler are integrally molded from a polymeric or other material or materials which can withstand the temperatures inside a projection television cabinet, meet the strength requirements to mount the CRT to the lens assembly and the entire CRT/lens assembly to a chassis of the cabinet structure of the projection television and, in certain embodiments, withstand any undesirable chemical reaction which might be caused by coolant fluid associated with the assembly. One advantage of an integrally formed coupler and focus mount can be the elimination of any flaking of the coating used to create the black finish inside the coupler. Various integral constructions of the focus mount and CRT coupler are possible and may include the use of multiple types of materials, such as metals, plastics, ceramics, etc., and various manufacturing techniques. The integral focus mount and CRT coupler may, for example, be formed of a co-molded or over-molded construction of multiple materials (e.g., metal and/or nonmetal) depending on the combined properties needed or desired in the resulting construction. As another possible alternative, the integral focus mount and coupler may be formed with metal injection molding techniques, such as thixomolding or made of aluminum or other metal material through the die casting process.

In another aspect of the invention, a generally tubular element, separate from the CRT coupler, may be used to receive a coolant fluid located generally between the CRT and the second optical lens element (e.g., a "C" lens element). This generally tubular element may be configured as a flexible bladder formed of a resilient material which expands to accommodate expansion of the coolant fluid when heated by the CRT. In this manner, the bladder may include a fill port for introducing the coolant fluid, but need not include a conventional and separate expansion bladder as typically used in couplers formed separately from an aluminum casting. In addition, the bladder keeps the fluid isolated from the coupler material which allows the opportunity to use additional materials for the coupler.

In another aspect of the invention, a flange may be positioned between the CRT and the CRT coupler and may include at least one angled portion configured to set a Scheimpflug angle at which the CRT is adapted to be mounted relative to the longitudinal axis. In the case in which the flexible bladder is not used, the flange may receive a seal for sealing the space between the CRT coupler and the CRT which will receive the coolant fluid. The seal may be generally U-shaped in cross section in order to seal both sides of the flange. It is also possible to accomplish this sealing by using two separate seals instead of a U-shaped seal. The use of a separate flange which sets the Scheimpflug angle reduces costs and complexity relative to, for example, incorporating a Scheimpflug angle in the coupler itself. In the case in which the generally tubular member (e.g., the flexible bladder) is not used, the CRT coupler may include a port for introducing the coolant fluid into the space between the CRT coupler and the CRT. In that case as well, a separate expansion bladder may be introduced through the fill port or other port in the CRT coupler and configured to expand upon heating of the coolant fluid by the CRT. A clamp plate may be used to secure the second optical lens (e.g., a "C" lens element), with threaded fasteners, spring clips, or other manners of securement. An advantage to integrating the focus mount and coupler is to provide more accurate positioning of the second optical lens element (e.g., the "C" element) to the first optical lens element (e.g., an A/B lens group). Another advantage to integrating the focus mount and coupler is that the sealing surface(s) can have a surface finish that is very suitable for sealing with no secondary machining operations necessary. Still another advantage is that it can easily provide a mechanical method to align the "C" element to the coupler in a rotational manner. This method ensures better consistency in the lens performance.

According to another inventive aspect, this clamp plate can include an opening or mask that serves as a light stop for the "C" element. Such an opening or mask can alternatively or also be formed in the coupler or in a separate piece secured against the coupler. The two masks can be used independently or together. A benefit of this feature is to eliminate the need to paint the "C" element to create a light stop. According to another inventive aspect, this clamp plate can include a generally rectangular opening or mask adapted to receive light from the CRT and transmit the light in the form of a generally rectangular-shaped image to the screen. Another correspondingly shaped and aligned mask may be formed directly in the coupler. Alternatively, the other correspondingly shaped and aligned mask may be clamped in place on an opposite side of the second optical lens element. This latter alternative allows for the easy addition of such a mask or masks to the overall assembly. The generally rectangular shape may have one of the standard format ratios of length to width for projection televisions, e.g., 4:3 or 16:9. This feature serves to improve the contrast of the optical system by reducing unwanted light. As contemplated herein such a generally rectangular mask may be formed by a separate member located adjacent to one of the lens elements in the assembly or system, or it may be formed by a coating on the lens or lenses.

These and other objects, advantages and features of the invention will become more readily apparent to those of ordinary skill in the art upon review of the following detailed description of the preferred embodiments taken in conjunction with the accompanying drawings.

DETAILED DESCRIPTION

Figure 1:
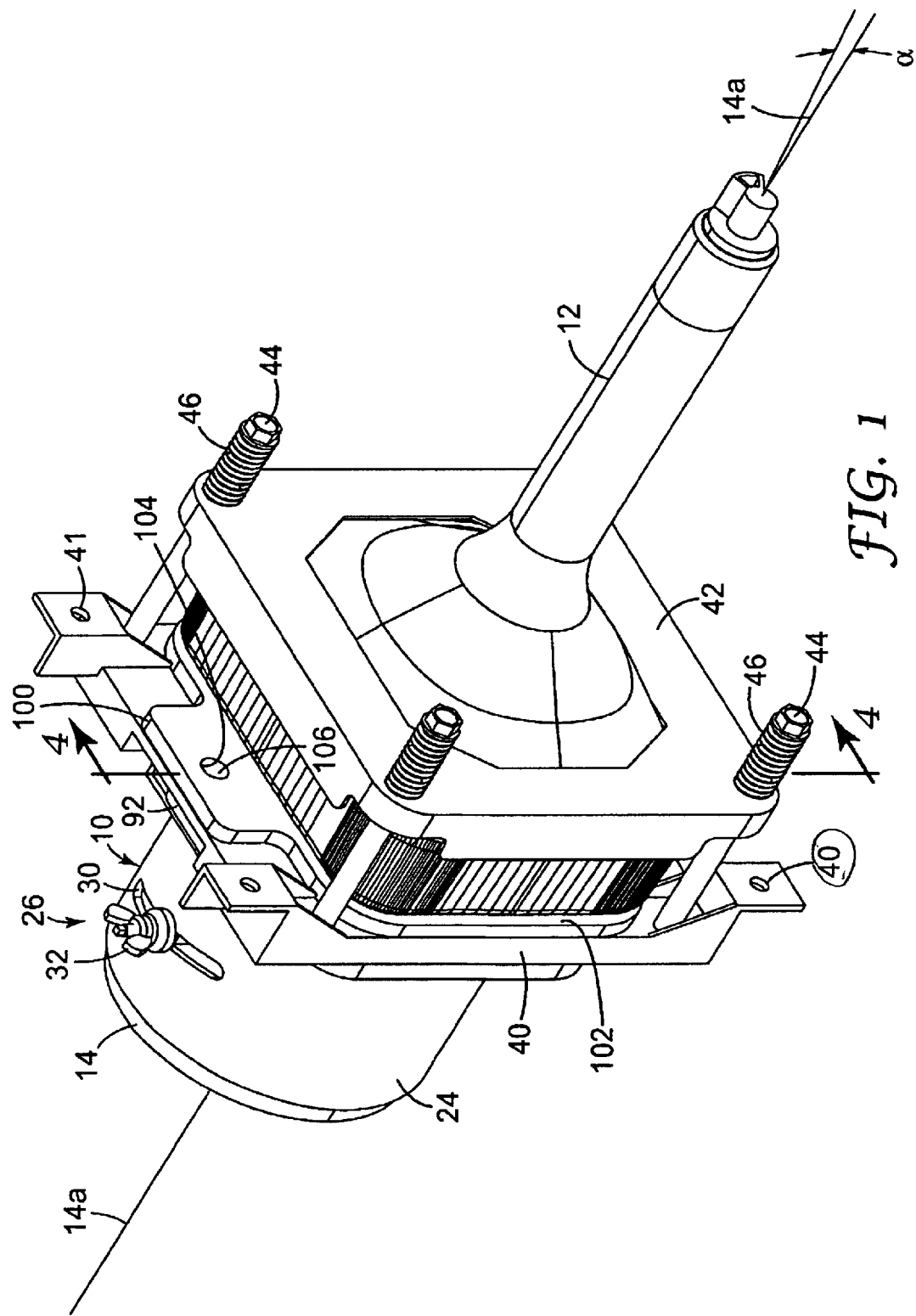
FIG. 1 is an assembled perspective view of a first embodiment of a lens and CRT assembly constructed in accordance with the invention.
Figure 2:
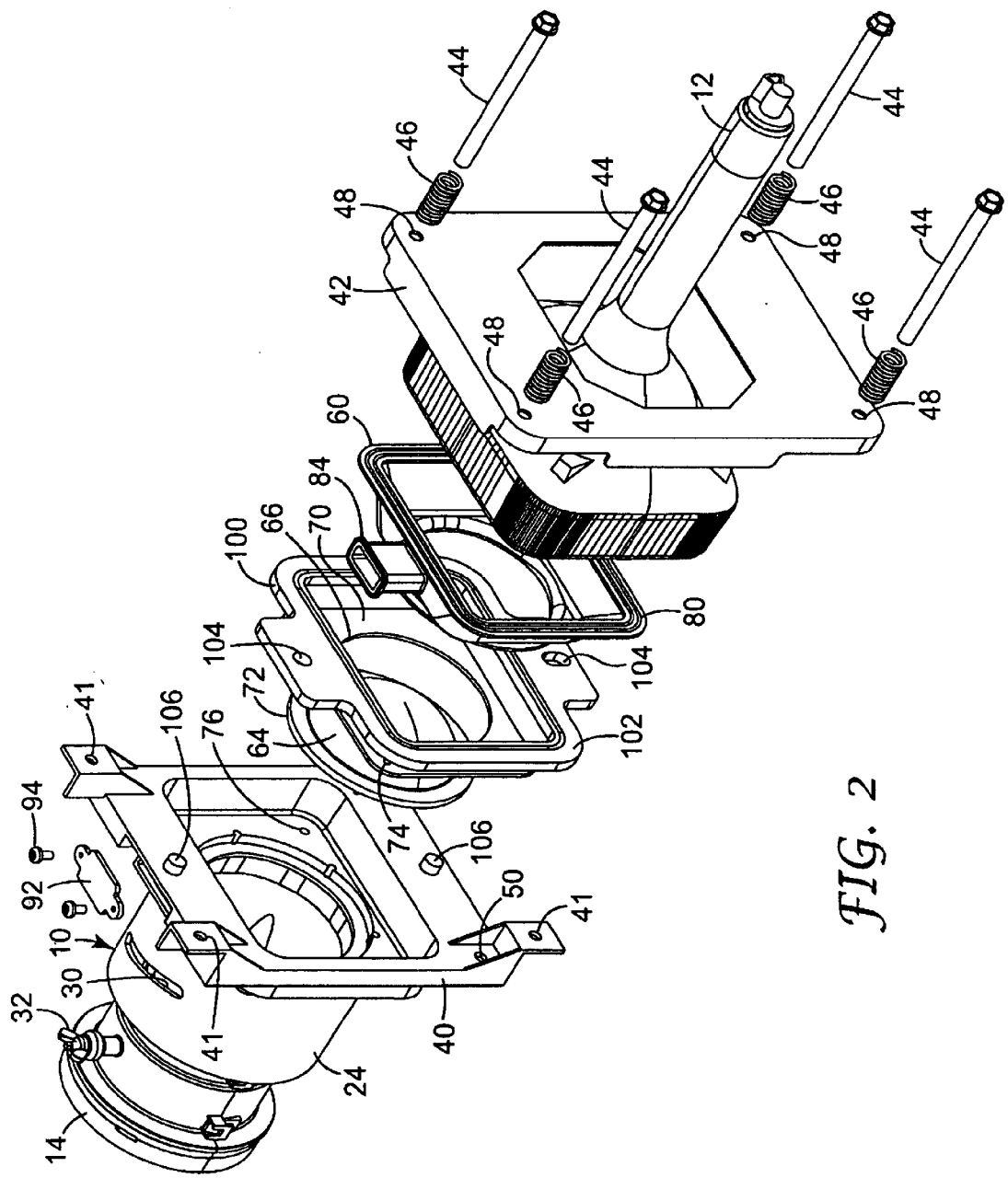
FIG. 2 is an exploded perspective view of the assembly shown in FIG. 1.
Figure 3:
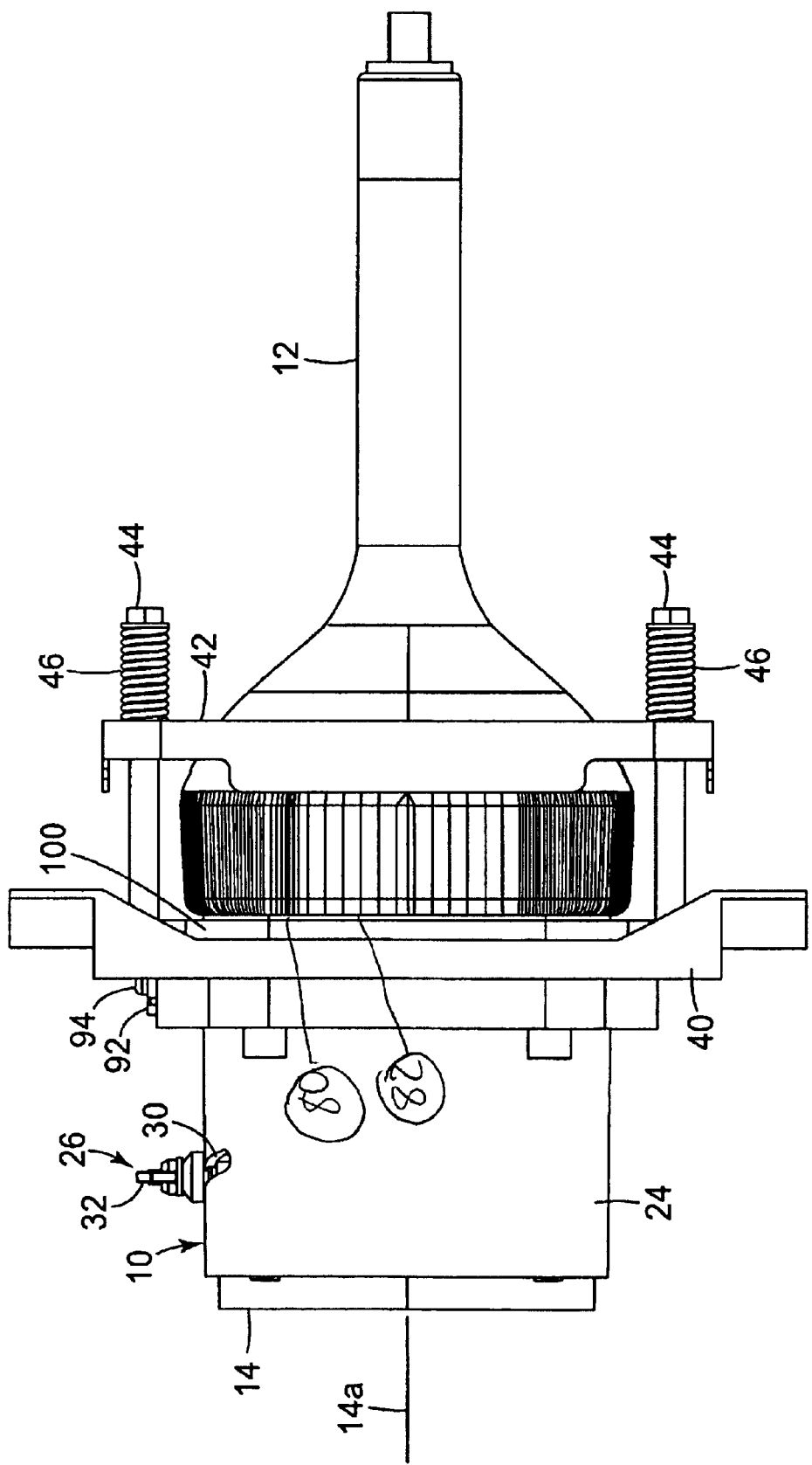
FIG. 3 is a side elevational view of the assembly shown in FIG. 1.
Figure 4:
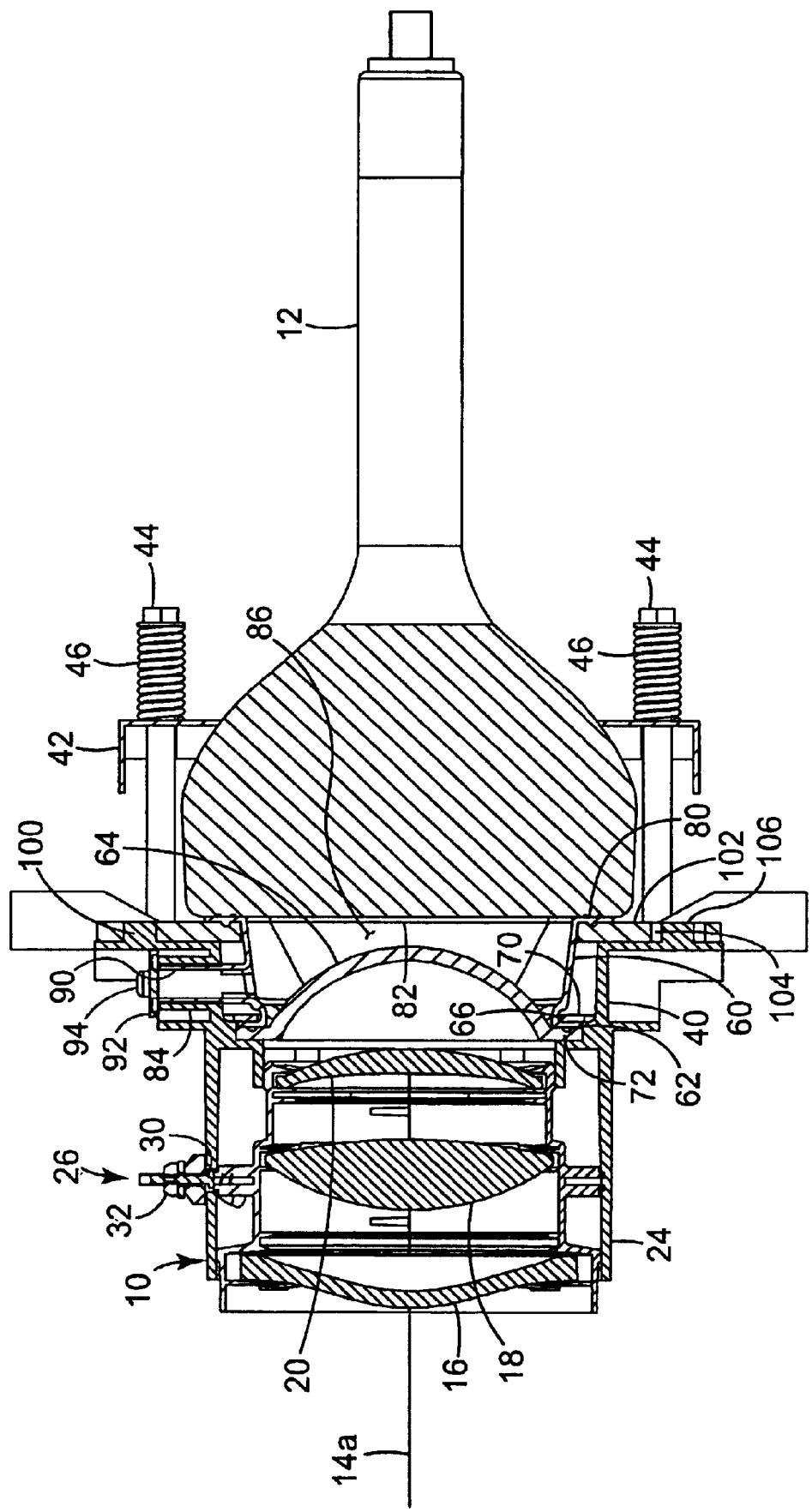
FIG. 4 is a cross sectional view of the assembly shown in FIG. 1 and taken along line 4—4.
Figure 5:
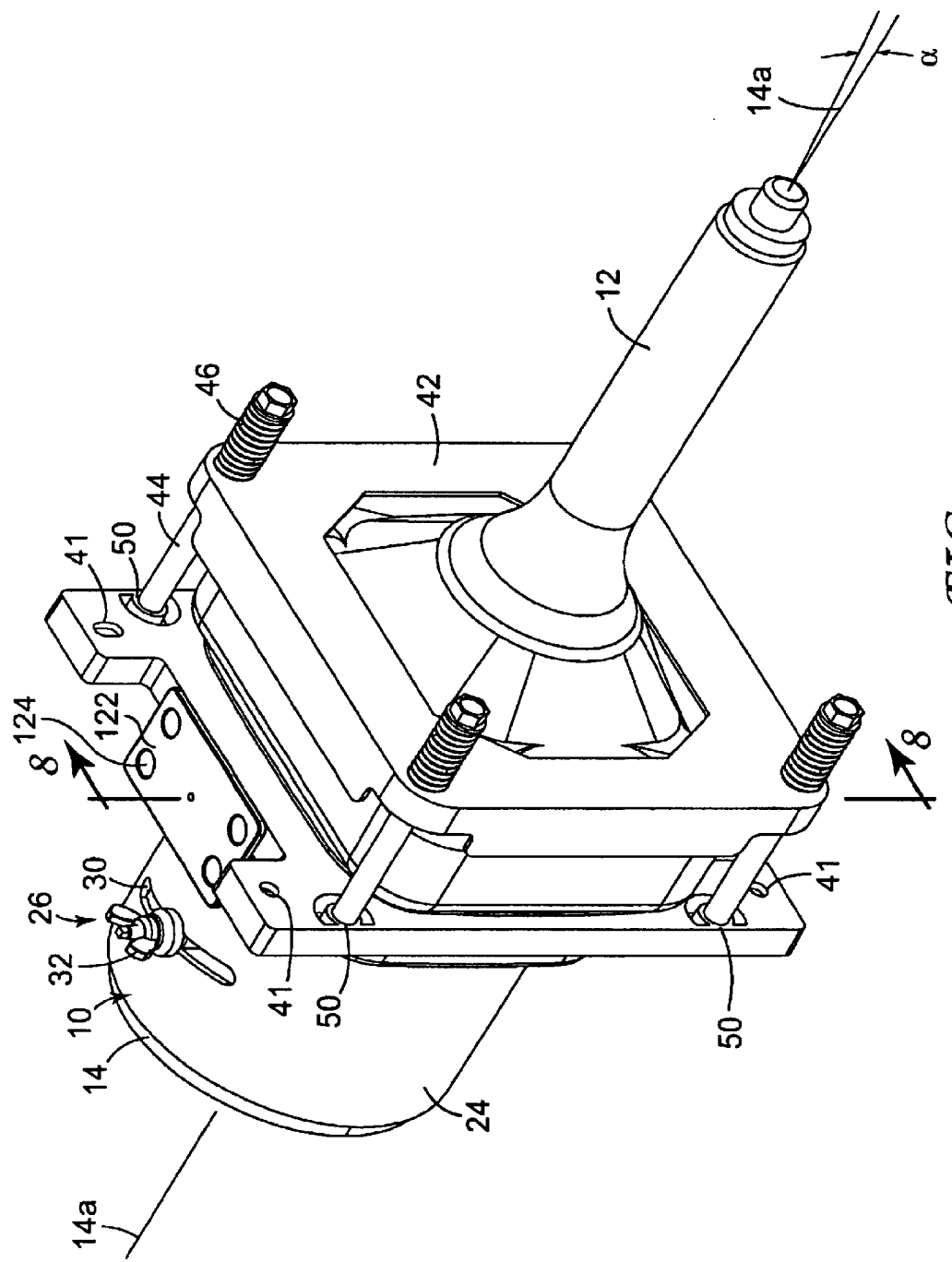
FIG. 5 is an assembled perspective view of a lens and CRT assembly constructed in accordance with a second embodiment of the invention.
Figure 6:
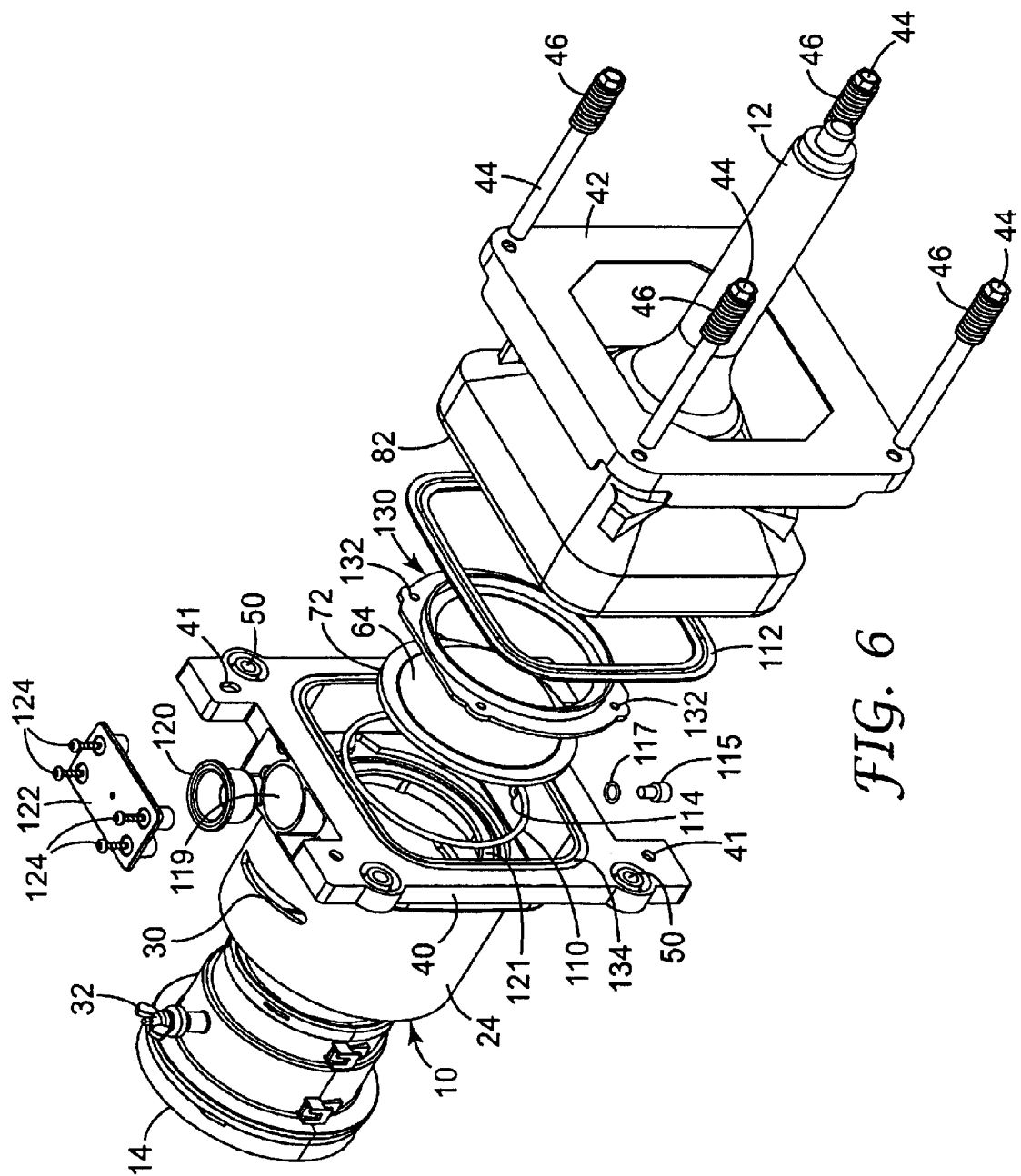
FIG. 6 is a disassembled perspective view of the assembly shown in FIG. 5.
Figure 7:
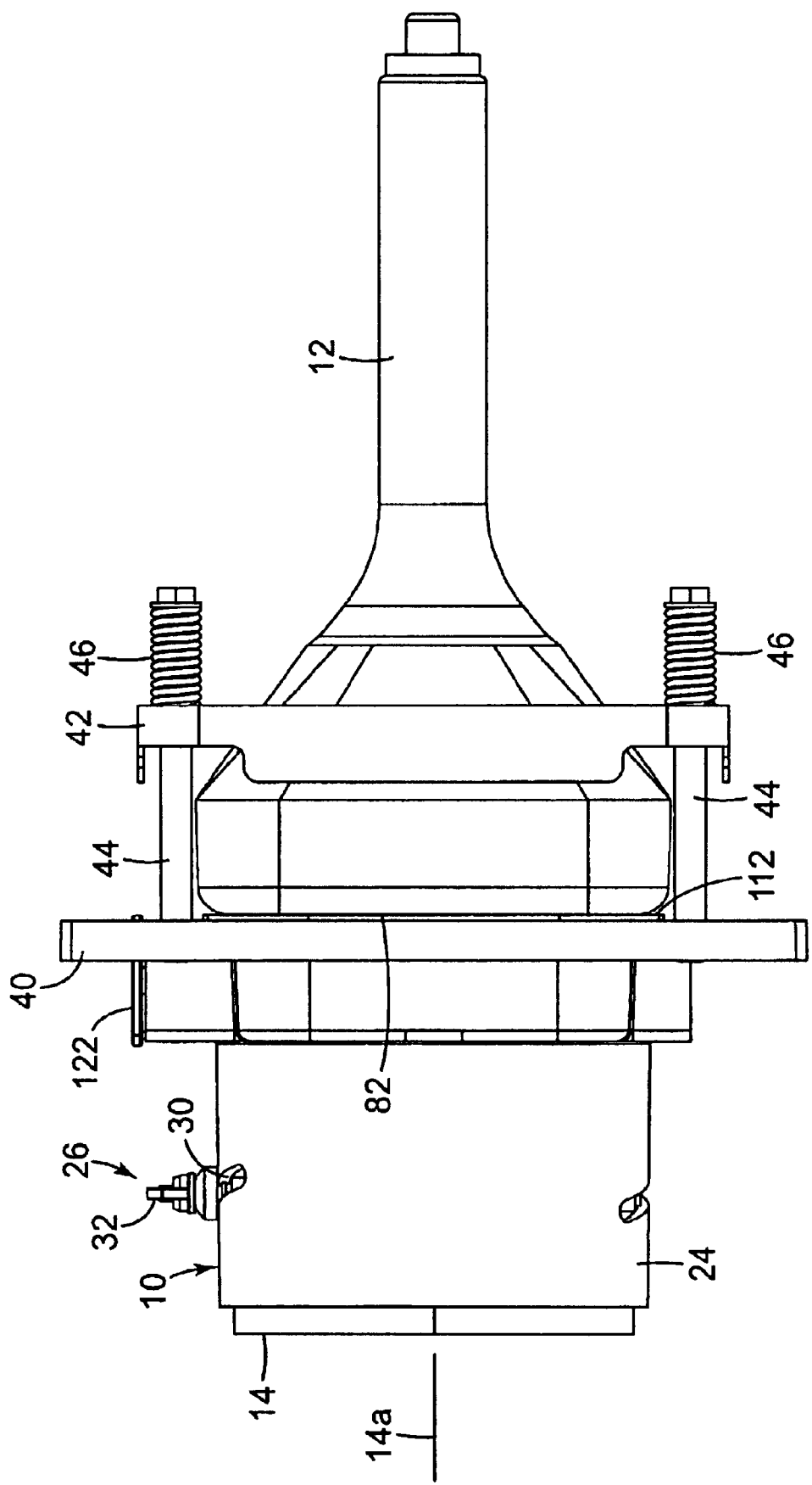
FIG. 7 is a side elevational view of the assembly shown in FIG. 5.
Figure 8:
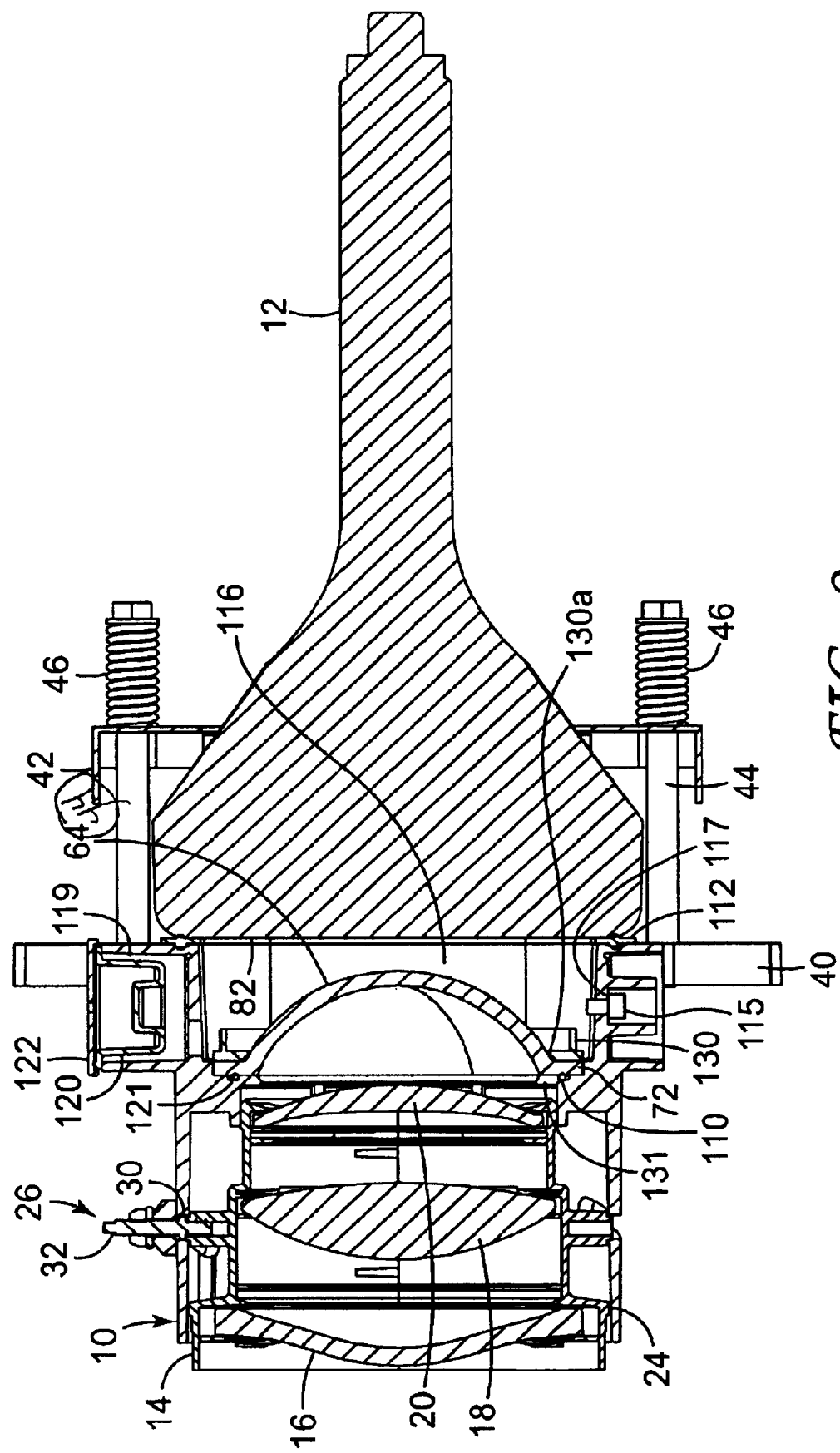
FIG. 8 is a cross sectional view of the assembly shown in FIG. 5 and taken along line 8—8.

FIGS. 1–4 illustrate a first embodiment of the invention. Specifically, a lens assembly 10 is connected to a CRT 12 and includes a tubular lens mount 14 having a longitudinal axis 14a and at least a first optical lens element mounted therein along the longitudinal axis 14a. In this embodiment, multiple lens elements 16, 18, 20 are mounted within the tubular lens mount 14 and may comprise separate "A" and "B" lens elements as are conventionally used in projection television lens systems. The tubular lens mount 14 is mounted within a tubular focus mount 24 extending along the same longitudinal axis 14a and adjustable fastening and locking structure 26 connects the lens mount 14 to the focus mount 24 allowing a focus position to be obtained and locked in place between the lens mount 14 and the focus mount 24. This fastening and locking structure 26 may comprise a slot 30 in the focus mount 24 and conventional threaded fastening and clamping elements 32 coupled with the lens mount 14 in a known manner. Because the slot 30 is angled transversely to the longitudinal axis 14a, rotation of the lens mount 14 relative to the focus mount 24 will change the longitudinal position of the lens mount 14 and the focus mount 24 relative to each other along the longitudinal axis 14a. This changes the focus of the lens system by changing the distance of the optical lens elements 16, 18, 20 in the lens mount 14 relative to the CRT 12. In accordance with the invention, a CRT coupler 40 is formed integrally with the focus mount 24 and includes CRT fastening structure for securing the CRT thereto and projection television fastening structure (e.g., holes 41) for securing the CRT coupler to the mounting structure within the projection television cabinet (not shown). In this embodiment, the fastening structure for securing the CRT 12 to the integrally formed CRT coupler 40 comprises a clamp plate 42 and four threaded fasteners 44 and springs 46 which extend through holes 48 in the clamp plate 42 and aligned holes 50 in the coupler 40. Threaded nuts (not shown) may be used to hold the threaded fasteners 44 to the CRT coupler 40.

A generally tubular element comprising a flexible bladder 60 is secured between the CRT coupler 40 and the CRT 12. On one end, a circular sealing portion 62 is provided to seal against a "C" lens element 64. To facilitate this sealing function, the seal portion 62 extends through a circular opening 66 in a clamp plate 70 and the clamp plate 70 is then secured against a flange portion 72 of the "C" lens element 64 and secured against coupler 40, for example, using threaded fasteners (not shown) extending through respective holes 74, 76 (one of each shown) in the clamp plate 70 and the coupler 40. On the opposite end of the flexible bladder 60, a face seal 80 is formed and seals against the faceplate 82 of the CRT 12 when the CRT 12 is clamped in place and held against the coupler 40 as previously described. The bladder 60 includes a fill port 84 for introducing a coolant fluid (not shown) into the space 86 it forms between the faceplate 82 of the CRT 12 and the "C" lens element 64. The flexible bladder 60 is formed of a resilient material, such as a thermoplastic or thermoset natural or synthetic rubber, or other material, which can expand to accommodate expansion of the coolant fluid when heated by the CRT 12. In this manner, the use of a separate expansion bladder and separate fill portion/plug or seal are not necessary. The fill port 84 of the flexible bladder 60 extends through an opening 90 in the coupler 40 and is covered by a cover plate 92 secured to the coupler 40 by fasteners 94.

In this embodiment, as well as others that utilize a focus mount integrally formed with a coupler, more accurate alignment and positioning can be obtained between the various lens elements in the system. This is because closer tolerances can be maintained when integrally forming a component, such as through molding, than when assembling separate components.

A flange 100 may be positioned between the CRT 12 and the CRT coupler 40 and may include at least one angled portion or surface 102 configured to set a Scheimpflug angle a at which the CRT faceplate 82 is mounted to extend relative to the longitudinal axis 14a of the lens mount 14 and focus mount 24. Alternatively, the Scheimpflug angle may be established by an angled surface formed directly on the coupler 40. Surface 102, which comprises an annular surface on one side of flange 100, lies in a plane oriented at an angle (e.g., 1° to 2°) relative to the plane which contains the annular surface on the opposite side of flange 100. The flange 100 may be provided with holes 104 which align with pins 106 extending from the coupler 40 to ensure proper alignment between the CRT faceplate 82 and the coupler 40. It will be appreciated that, in a typical projection television, the two outer CRT/lens assemblies have equal and opposite Scheimpflug angles (e.g., about 1° to 2°). However, the center CRT/lens assembly is not designed with a Scheimpflug angle, i.e., the center CRT/lens assembly has a corresponding angle of 0°. To further accommodate the angled CRT 12, spacers (not shown) having identical wedge shapes (i.e., one surface angled relative to an opposite surface) may be placed between nuts (not shown) threaded onto fasteners 44 and coupler 40 on the side opposite to CRT 12. Alternatively, if holes 50 are threaded or self-tapping, then holes 50 can be oriented at the required angles.

FIGS. 5–8 illustrate a second embodiment of the invention. In this embodiment and the embodiments that follow, like reference numerals refer to corresponding elements of structure previously described with respect to the first embodiment shown in FIGS. 1–4. For this reason, additional discussion of such like elements is not necessary. As necessary, slight differences between corresponding elements of structure are described below. As will be appreciated by a review of FIGS. 5–8, this embodiment eliminates the flexible bladder 60 and, instead, respective seals 110, 112 are provided between the "C" lens element 64 and the coupler 40, and between the coupler 40 and the faceplate 82 of the CRT 12. Thus, the coolant fluid (not shown) is introduced through an opening 114 in the coupler 40 into a space 116 defined by the coupler 40 itself and located between the "C" lens element 64 and the CRT faceplate 82. A plug 115 and O-ring 117 seal hole 114. Since the flexible bladder 60 of the first embodiment is no longer present and no longer serves as an expansion bladder, a separate expansion bladder 120 is introduced into an opening 119 of the coupler 40 and is covered by a cover plate 122 secured with fasteners 124. The "C" lens element 64 is secured in place by a clamp plate 130 with screws (not shown) extending through holes 132 in the clamp plate 130 and aligned holes (not shown) in the coupler 40. This creates a sealing relation between the "C" lens element 64 and coupler 40 by compressing O-ring seal 110 against an annular surface 121 of coupler 40 (or focus mount 24). Circular edge portions 130a and 131 provide light stops to prevent transmission of unwanted light through "C" lens element 64. Edge portion 130a is formed on clamp 130 and edge portion 131 is formed on coupler 40, although it may instead be a separate piece which is clamped in place. These light stops are preferably blackened, such as through the use of a coating or material choice. The CRT 12 is again secured by a clamp plate 42 and threaded fastener/spring assemblies 44, 46 as previously described with respect to the first embodiment. Seal 112 is retained against a sealing surface 134 formed in the coupler 40 and against the outer edge portions of the CRT faceplate 82. It will be appreciated that sealing surface 134, and any other necessary sealing surface associated with the focus mount 24 and/or coupler 40, are well suited for sealing without further machining when molded from a material, such as a polymer, which can leave the mold with a smooth surface finish. In this case, the material chosen for at least those portions of the coupler 40 which will be in contact with the coolant fluid should be resistant to degradation by such coolant fluid, in addition to being able to withstand the heat generated by the CRT 12.

Figure 9:
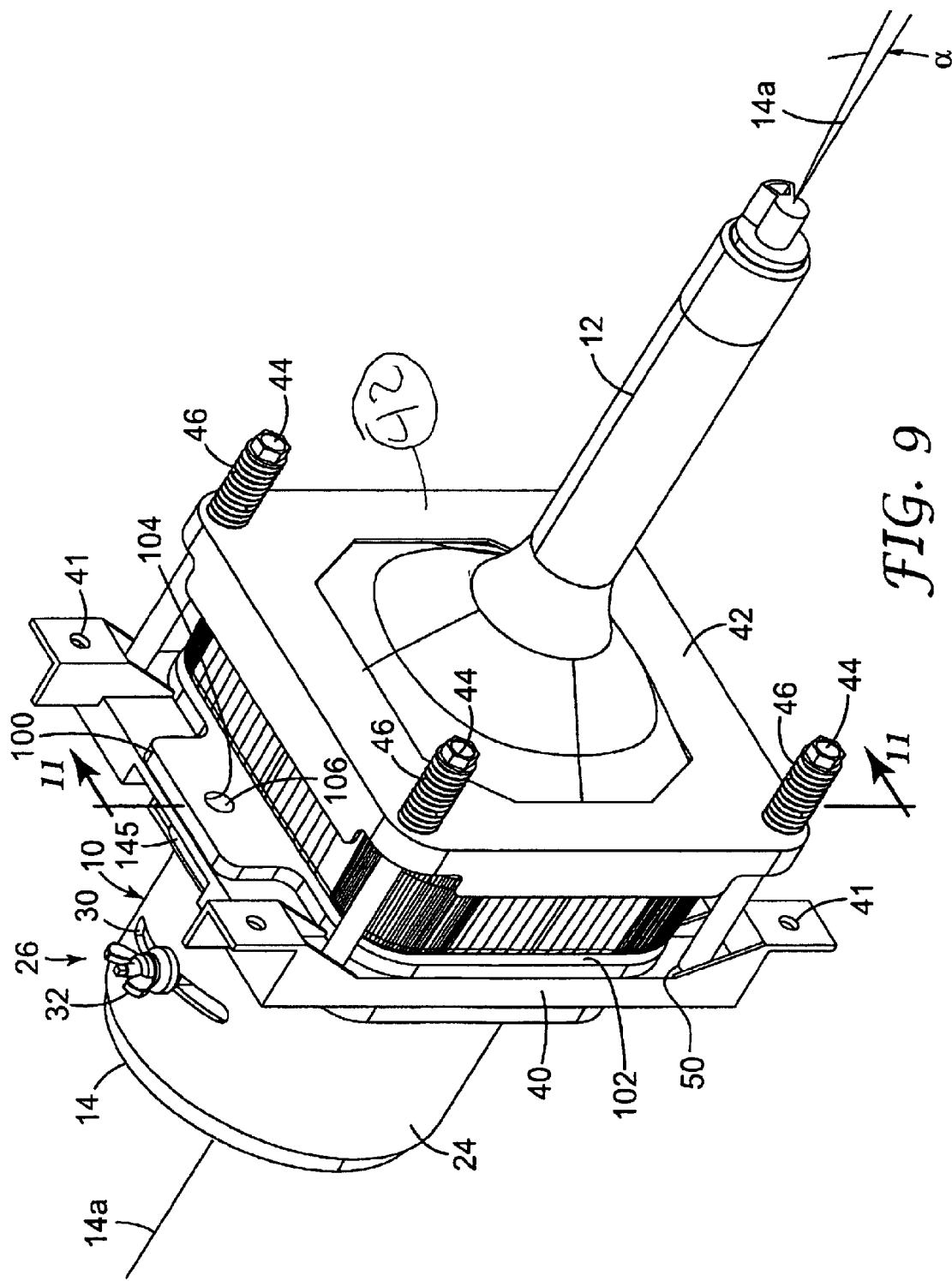
FIG. 9 is an assembled perspective view illustrating another embodiment of a lens and CRT assembly constructed in accordance with the invention.
Figure 10:
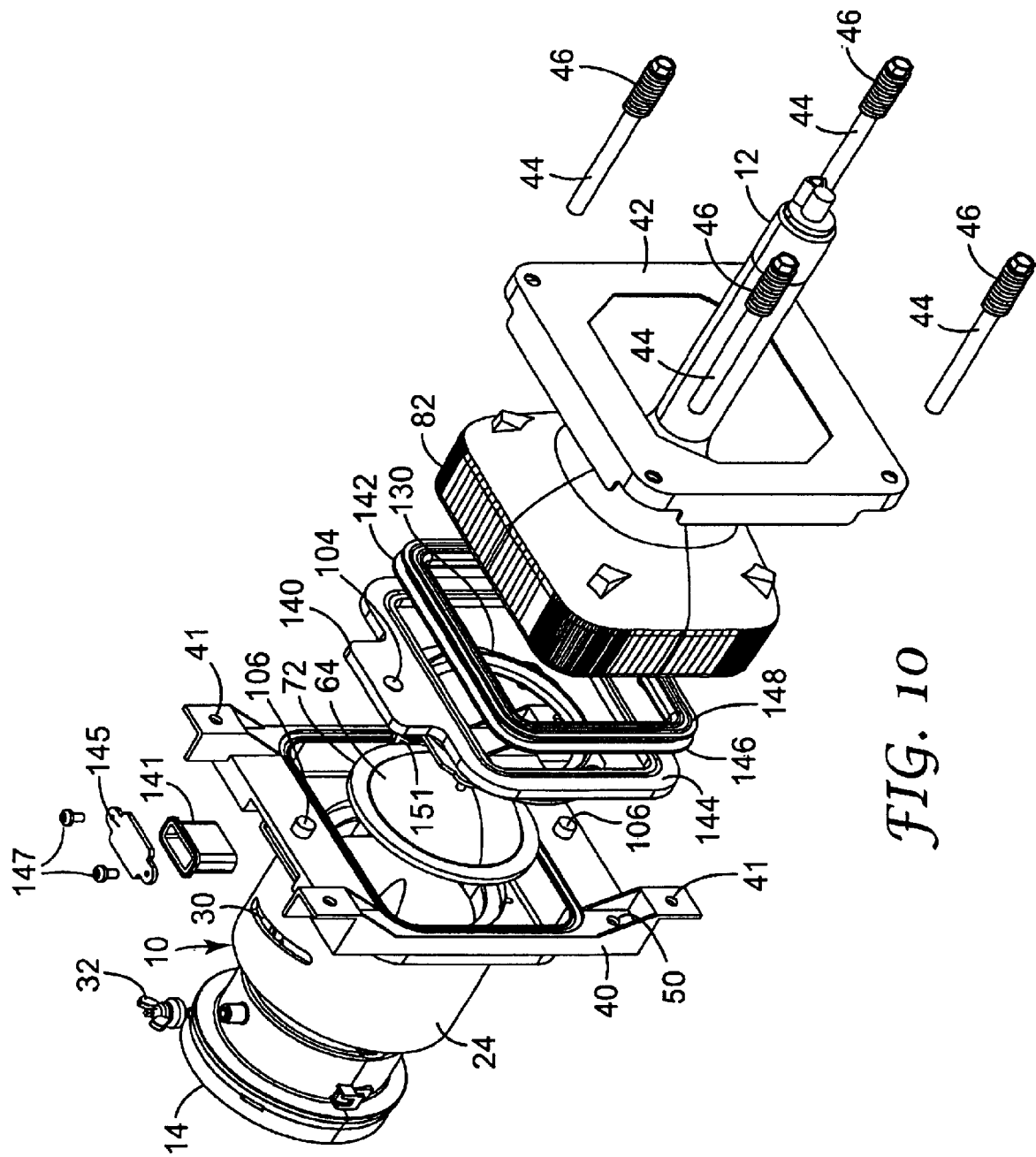
FIG. 10 is an exploded perspective view of the assembly shown in FIG. 9.
Figure 11:
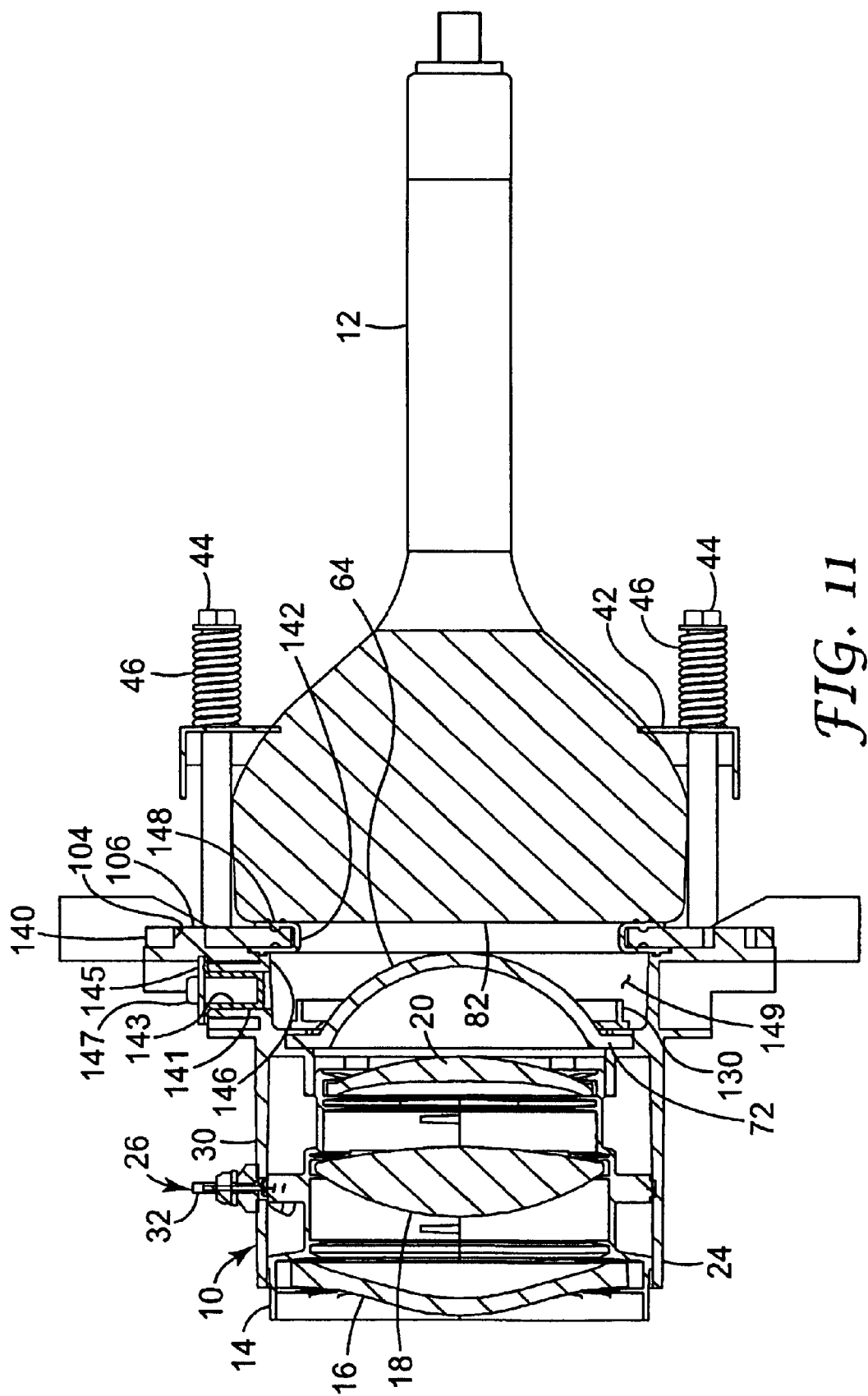
FIG. 11 is a cross sectional view taken along line 11—11 of FIG. 9.
Figure 12:
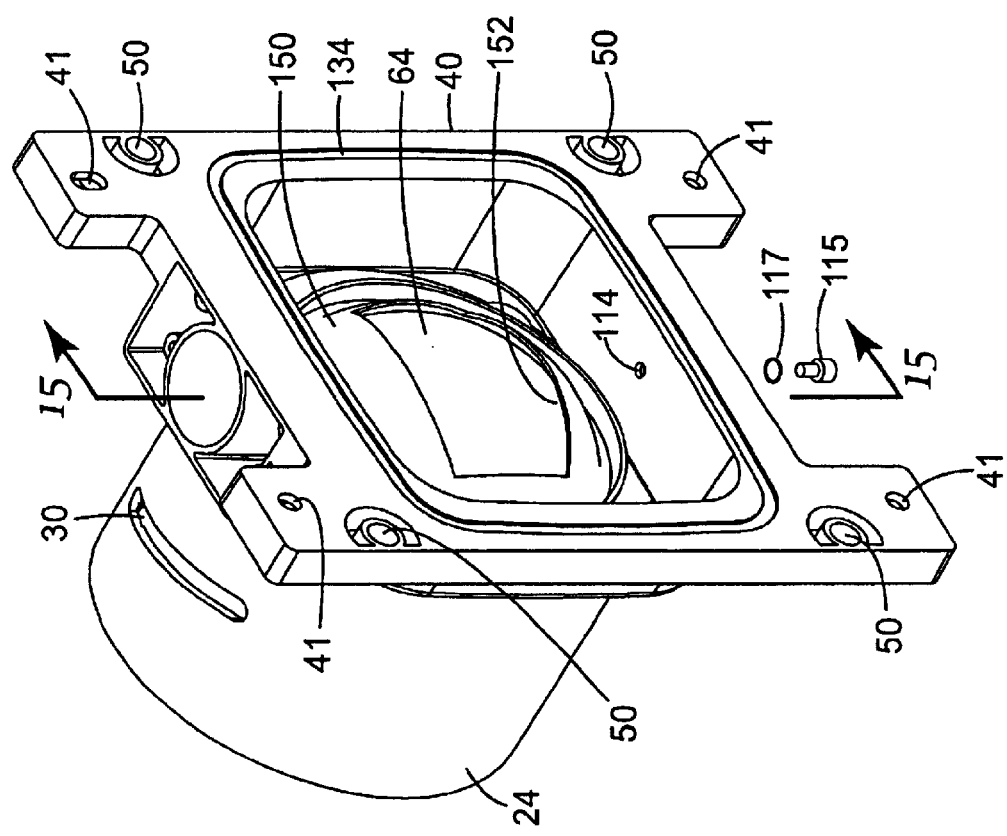
FIG. 12 is an assembled perspective view of another alternative embodiment illustrating an integrated focus mount/coupler having a "C" lens element and generally rectangular mask.
Figure 14:
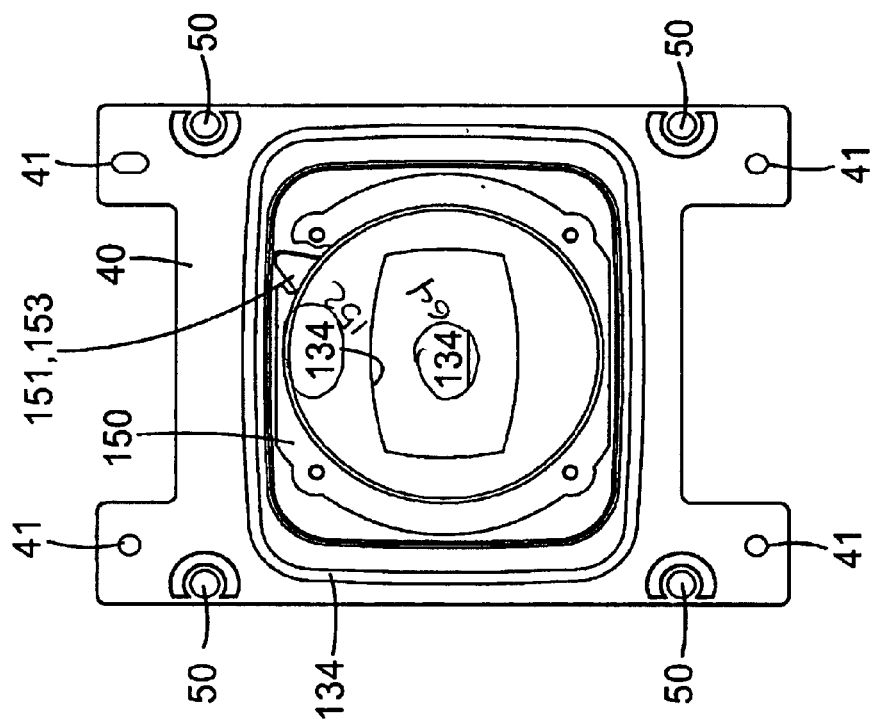
FIG. 14 is a front elevational view of the assembly shown in FIG. 12.
Figure 13:
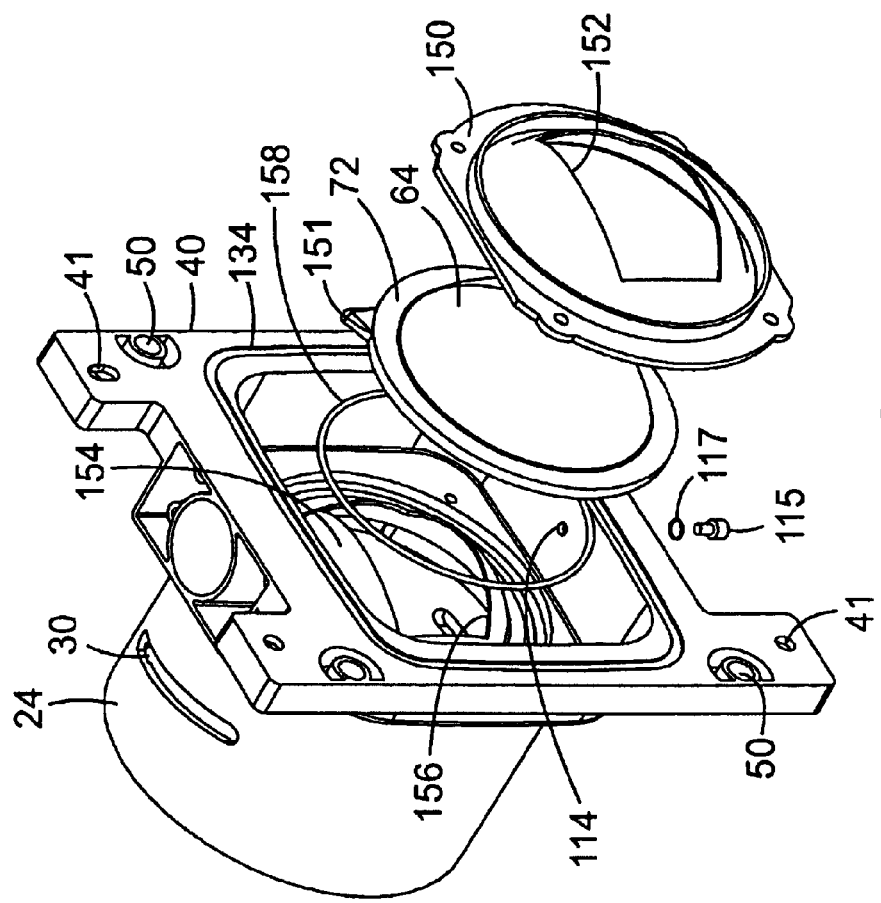
FIG. 13 is an exploded perspective view of the assembly shown in FIG. 12.
Figure 15:
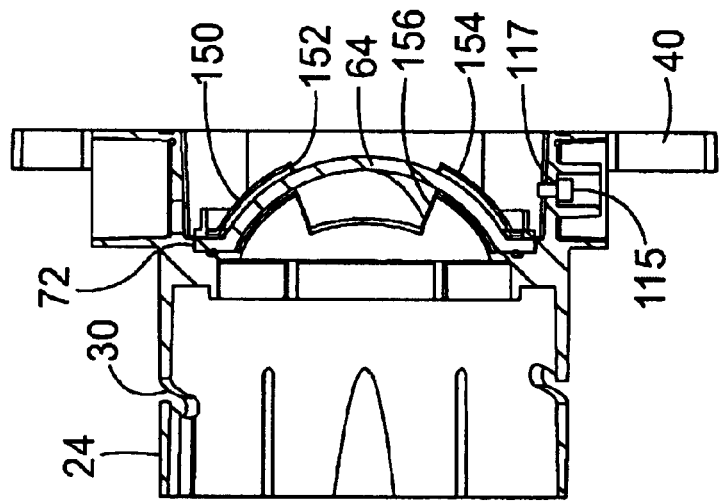
FIG. 15 is a cross sectional view taken along line 15—15 of FIG. 12.

FIGS. 9–11 illustrate one alternative embodiment for modifying the assembly shown in FIGS. 5–8 to easily accommodate the setting of a Scheimpflug angle a between the CRT faceplate 82 and the lens assembly/focus mount axis 14a. In this regard, the seal 112 between the CRT 12 and the coupler 40 is replaced by a separate flange 140 and seal 142 arrangement. The flange 140 includes at least one angled portion or surface 144 which sets the appropriate Scheimpflug angle a and the seal 142 is generally U-shaped in cross section such that it provides sealing surfaces 146, 148 on the side of the flange 140 facing the CRT faceplate 82 and the opposite side of the flange 140 facing the coupler 40. This seals the space 149 between "C" lens element 64 and faceplate 82 for receiving coolant fluid (not shown). The coolant fluid may be introduced through a port 143 which receives an expansion bladder 141 and is then sealed by a cover plate 145 fastened to coupler 40 by screws 147. Alternatively, a separate fill port may be provided as described herein. FIG. 10 also shows a triangular registration tab element 151 on "C" element 64 that fits into mating triangular registration recess or element 153 (FIG. 14) in coupler 40. This prevents rotation of the "C" element 64 and provides a consistent and positive rotational orientation of the "C" element 64 in the coupler 40. This allows a more reliable positioning method than the current method of simply visually locating such an element relative to some reference point on the coupler.

FIGS. 12–15 illustrate a clamp plate 150 which includes a generally rectangular opening 152 or mask in a shape appropriate for the image to be displayed on the projection television screen (not shown). For example, this masked opening 152 may correspond to a length to width ratio in the standard 4:3 or 16:9 formats currently used in projection televisions. The clamp plate 150 is used to secure the "C" lens element 64 to the coupler 40 and allows the transmission of light from the CRT 12 through the "C" lens element 64 in the chosen generally rectangular format or shape through the "C" lens element 64 to the A/B elements 16, 18, 20 in the lens mount 14. An additional mask plate 154 with a correspondingly configured and aligned opening 156 is also preferably provided on an opposite side of "C" lens element 64. The mask 154 is preferably formed as an integral part of coupler 40. Alternatively, mask plate 154 may be a separate component held against a surface in the focus mount 24 or coupler 40. A sealing relation is preferably provided between coupler 40 and "C" element 64 by an O-ring 158. Preferably, plates 150, 154 are colored black or are otherwise rendered opaque to block unwanted light.

Figure 14A:
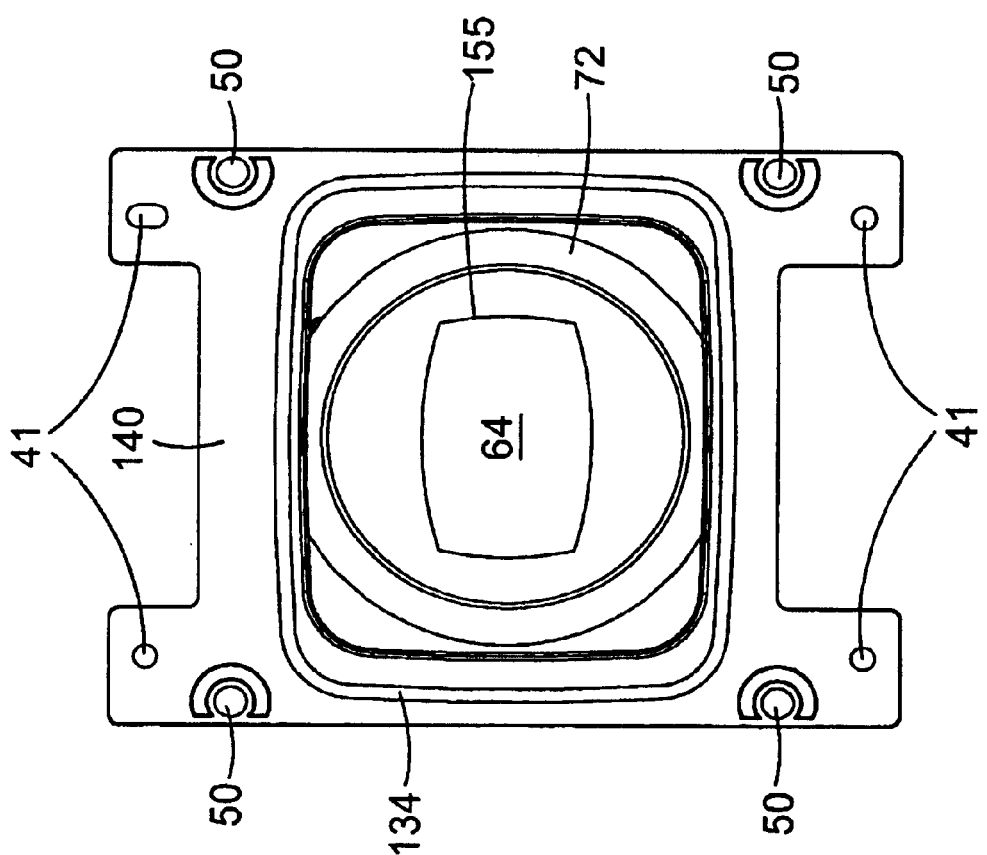
FIG. 14A is a front elevational view of an alternative lens design which utilizes a mask formed by a coating.

FIG. 14A illustrates a front view of a modified mask which provides a generally rectangular transparent area 155 as described herein directly on "C" element 64. The area of "C" element 64 aside from area 155 is painted black or similarly coated. This coating may be placed on either or both sides of "C" element 64, although it may be preferable to leave the side of "C" element 64 which is exposed to the coolant fluid free of any coating to prevent flaking thereof and contamination of the coolant fluid. It will further be appreciated that such a mask coating may be additionally or alternatively used on any one or more of lens elements 16, 18, 20 to likewise prevent the transmission of unwanted light through the lens system. In a similar context, mask plates similar to plates 150 and 154 may be positioned adjacent or between any one or more of the lens elements 16, 18, 20 previously described for similar purposes.

The shape of the mask is generated by projecting the generally rectangular image at the screen, back through the lens elements 16, 18, 20 to the surface that the mask will be placed against. This is easily done on a computer with a conventional ray-tracing program. Current CRT projection lenses have up to 10–12% distortion that is corrected on the phosphor of the CRT. Thus, the shape of the mask or opening 152, 156 is a distorted rectangle. The shape can also be distorted if it is in the shape of a curve to match the curve of the "C" element 64 or any other lens element in the system.

Figure 16:
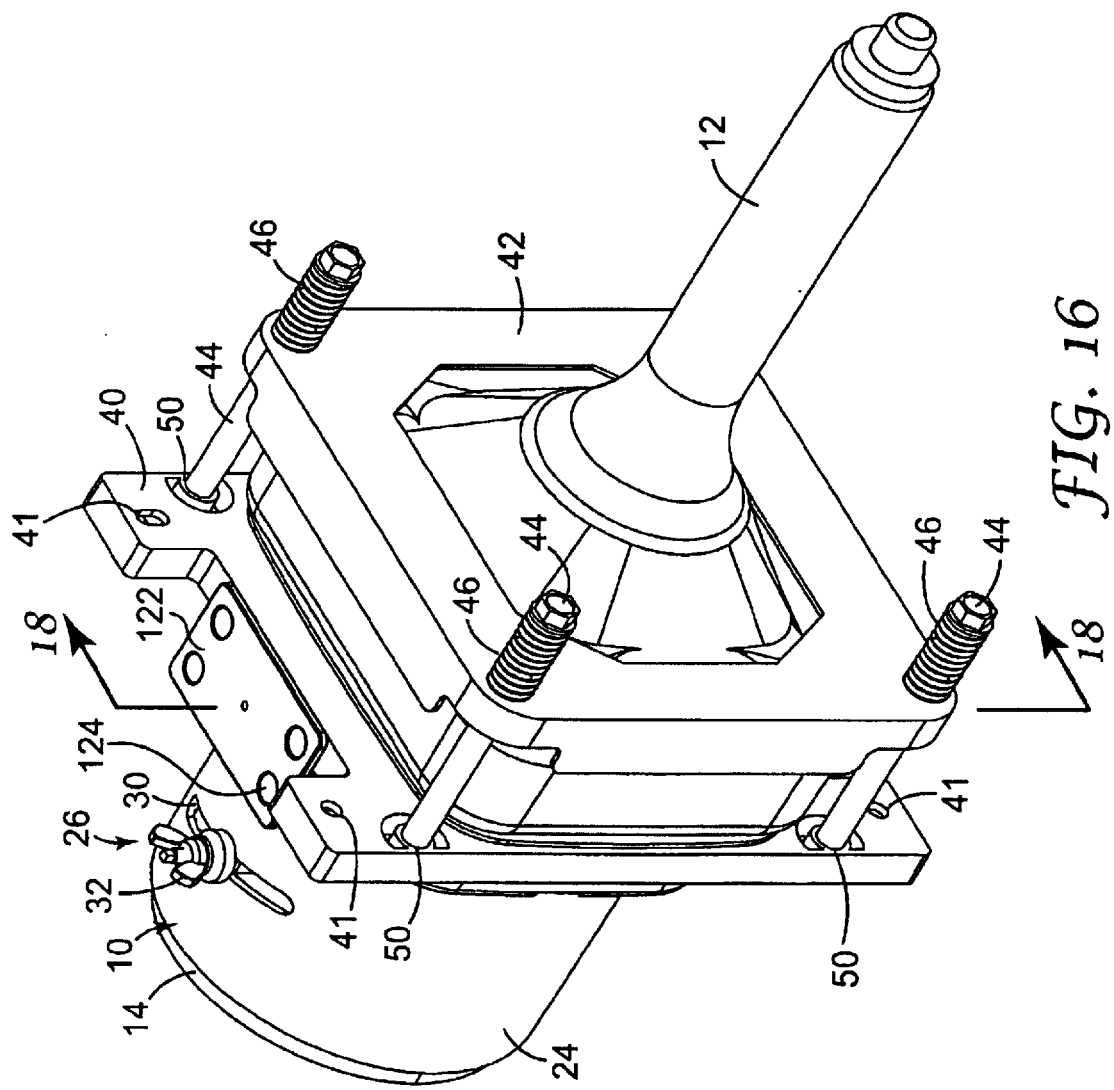
FIG. 16 is an assembled perspective view of another embodiment of a lens and CRT assembly constructed in accordance with the invention.
Figure 17:
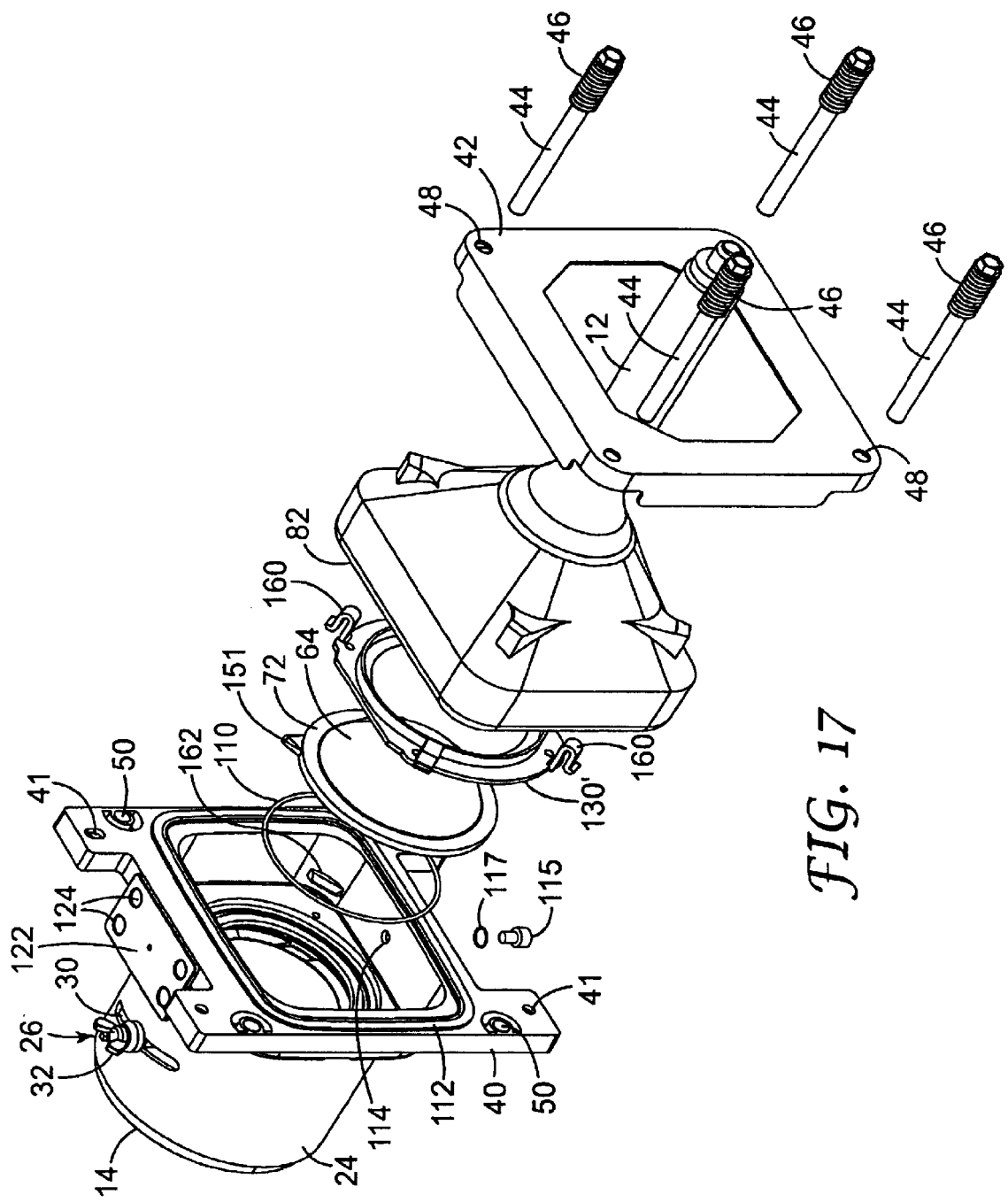
FIG. 17 is an exploded perspective view of the assembly shown in FIG. 16.
Figure 18:
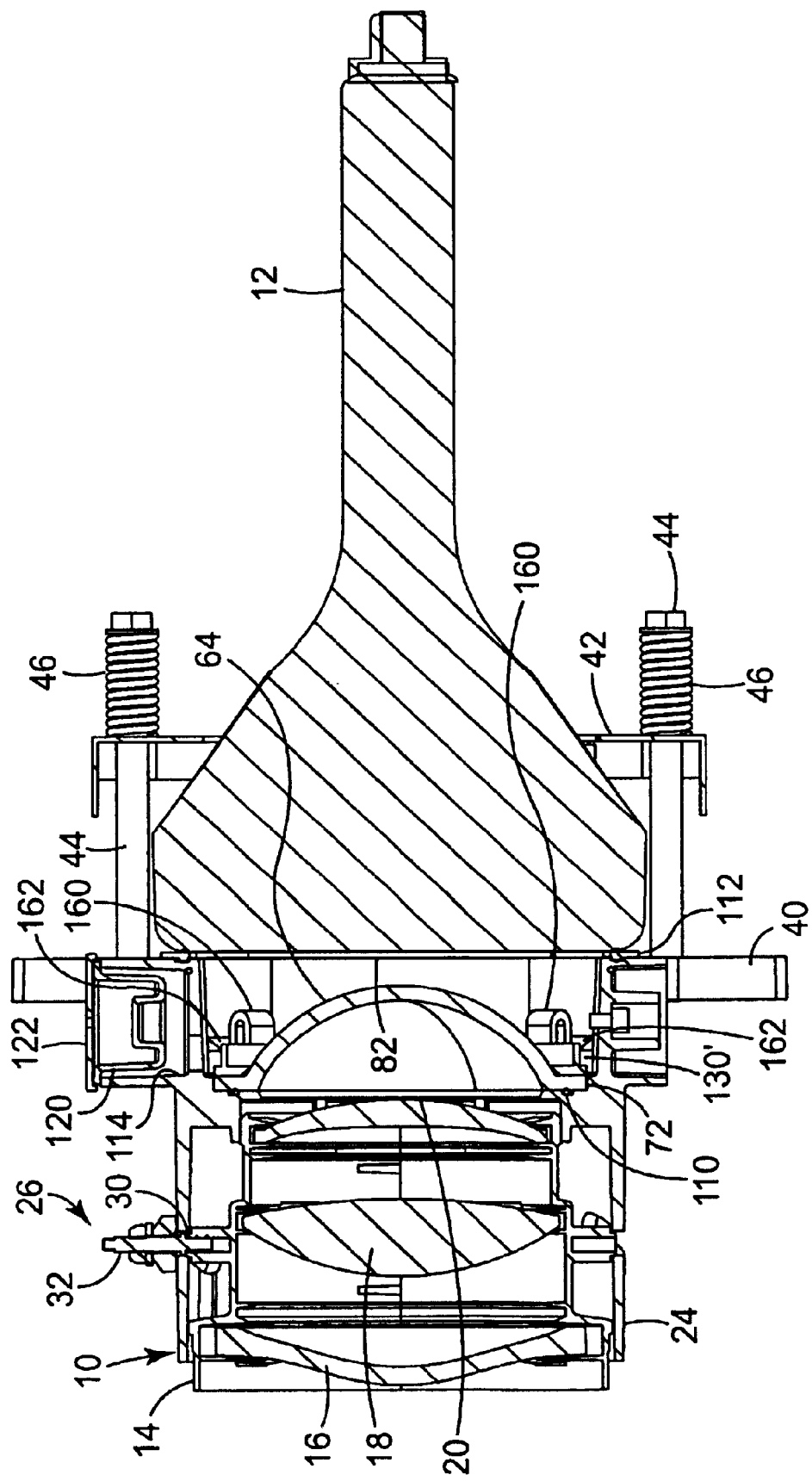
FIG. 18 is a cross sectional view of the assembly shown in FIG. 16 and taken along line 18—18.

FIGS. 16–18 illustrate an alternative arrangement for fixing the "C" lens element 64 to the coupler 40 through the use of spring clips 160 associated with a clamp plate 130' rather than with screw fasteners. Spring clips 160 clip into recesses or undercuts 162 provided in focus mount 40. The spring clips 160 may be formed integrally with clamp plate 130' or separately assembled components. As examples, the clamp plate and spring clips 130', 160 may be molded together or spring clips 160 may be stamped metal parts secured separately to clamp plate 130' or created entirely as one piece in a stamping or other manufacturing process. This provides for faster and easier assembly and reduces scrap by eliminating the possibility of stripped screw threads. This also prevents the fluid from being contaminated by particles from screws or coupler broken loose during the screwing process. It also allows rework of the assembly without having to worry about stripped screw bosses or stray material getting in fluid from the threaded holes.

Materials for the integrated focus mount 24 and coupler 40 will be required to withstand high temperatures (approximately 100 degrees C.) while being soaked in ethylene glycol and glycerin and being clamped to the CRT 12. To withstand these conditions, it is necessary to find materials that are both strong enough and stiff enough to remain in dimension while under the stress. High temperature thermoplastic polymers that will withstand ethylene glycol typically need a glass or carbon fiber filler to meet the necessary mechanical conditions. Some partly crystalline and amorphous polymers that may withstand the chemical attack include, but are not limited to, Polyphenylene Sulphide (PPS), Polyphthalamide (PPA), Syndiotactic Polystyrene (SPS), Polysulfone (PSU), Polyamides (PA), Polyetherimide (PEI) and Cyclic Olefin Copolymer (COC). Other polymers could be used but may not be chosen for reasons of cost or reasons that are specific to the polymer. Some thermoset polymers are also capable of fulfilling the technical needs of the application. Components that may be manufactured with the materials included in the above list can also include the various clamp plates, flanges, with or without the Scheimpflug angle, and fill plug. Other components may be formed using other common materials known in the art.

Flexible bladder 60 should be formed of a material that can expand with the fluid as the temperature rises while still allowing the fluid to be contained. Several thermoplastic elastomer (TPE), thermoplastic rubber (TPR), thermoset rubber and silicone polymers could be used for this application. The selected material should be one which does not absorb or transmit high volumes of water.

Seals used in the various embodiments of this invention can be molded in ethylene propylene diene (EPDM) as is conventional.

While the present invention has been illustrated by a description of various preferred embodiments and while these embodiments has been described in some detail, it is not the intention of the Applicants to restrict or in any way limit the scope of the appended claims to such detail. Additional advantages and modifications will readily appear to those skilled in the art. The various features of the invention may be used alone or in numerous combinations depending on the needs and preferences of the user. This has been a description of the present invention, along with the preferred methods of practicing the present invention as currently known. However, the invention itself should only be defined by the appended claims, wherein we claim:

What is claimed is:

1. A lens assembly adapted to be connected to a CRT and affixed to mounting structure in a projection television cabinet, the lens assembly comprising:

a tubular lens mount having a longitudinal axis and at least a first optical lens element mounted therein along said longitudinal axis, a tubular focus mount connected to said tubular lens mount and extending along said longitudinal axis;

a CRT coupler formed integrally with said focus mount, said CRT coupler including CRT fastening structure for securing the CRT thereto and projection television fastening structure for securing said CRT coupler to the mounting structure with the projection television cabinet; and a second optical lens element mounted to said CRT coupler.

2. The lens assembly of claim 1, further comprising:
adjustable fastening and locking structure connecting said lens mount to said focus mount and allowing a focus position to be obtained and locked in place between the lens mount and the focus mount.

3. The lens assembly of claim 1, further comprising a generally tubular element configured for securement between said CRT coupler and the CRT, said generally tubular element adapted to receive a coolant fluid.

4. The lens assembly of claim 3, wherein said generally tubular element includes a fill port for introducing the coolant fluid into said generally tubular element.

5. The lens assembly of claim 4, wherein said generally tubular element further comprises a flexible bladder.

6. The lens assembly of claim 5, wherein said flexible bladder is formed of a resilient material which expands to accommodate expansion of the coolant fluid when heated by the CRT.

7. The lens assembly of claim 1, further comprising a flange for positioning between the CRT and said CRT coupler, said flange having at least one angled portion configured to set a Scheimpflug angle at which the CRT is adapted to be mounted relative to said longitudinal axis.

8. The lens assembly of claim 7, further comprising first and second seal members for respective positioning between said CRT coupler and said flange and between said flange and the CRT.

9. The lens assembly of claim 8, wherein said first and second seal members are portions of a seal having a generally U-shaped cross section and received by said flange, said first seal adapted for positioning between said CRT coupler and the CRT.

10. The lens assembly of claim 1, wherein said second optical lens element is secured with a clamp plate and threaded fasteners to said CRT coupler.

11. The lens assembly of claim 1, wherein said second optical lens element is secured with a clamp plate and spring clips to said CRT coupler.

12. The lens assembly of claim 1, wherein said CRT coupler includes a fill port for introducing a coolant fluid into a space between said CRT coupler and the CRT.

13. The lens assembly of claim 12, further comprising an expansion bladder communicating with said space, said expansion bladder configured to expand to accommodate expansion of the coolant fluid when the coolant fluid is heated by the CRT.

14. The lens assembly of claim 1, further comprising a clamp plate securing said second optical lens element to said CRT coupler, said clamp plate including a generally rectangular opening adapted to receive light from the CRT and transmit the light in the form of a generally rectangular-shaped image to said first optical lens element.

15. The lens assembly of claim 1, further comprising a plate positioned on an opposite side of said second optical lens element from the CRT, said plate including a generally rectangular opening adapted to receive light from the CRT and transmit the light in the form of a generally rectangular-shaped image to said first optical lens element.

16. The lens assembly of claim 15, wherein said plate is integrally formed with said focus mount and CRT coupler.

17. The lens assembly of claim 1, further comprising a first light stop plate positioned against a first side of said second optical lens element and configured to prevent unwanted light transmission in either direction through said second optical lens element.

18. The lens assembly of claim 17, further comprising a second light stop plate positioned against a second side of said second optical lens element and configured to prevent unwanted light transmission in either direction through said second optical lens element.

19. A lens assembly adapted to be connected to a CRT and affixed to mounting structure in a projection television, the lens assembly comprising:
a tubular lens mount extending along a longitudinal axis and having at least a first optical lens element mounted therein along said longitudinal axis,
a tubular focus mount connected to said tubular lens mount and extending along said longitudinal axis;
adjustable fastening and locking structure connecting said lens mount to said focus mount and allowing a focus position to be obtained and locked in place between the lens mount and the focus mount,
a CRT coupler formed integrally with said focus mount and including a first side facing said tubular lens mount and a second, opposite side for facing the CRT; and
a second optical lens element mounted on said second side of said CRT coupler.

20. The lens assembly of claim 19, further comprising adjustable fastening and locking structure connecting said lens mount to said focus mount and allowing a focus position to be obtained and locked in place between the lens mount and the focus mount.

21. The lens assembly of claim 19, further comprising:
a seal positioned against said second optical lens element and configured to seal a space between the CRT and said second, opposite side of said CRT coupler which receives at least a portion of said second optical lens element and is further adapted to receive a coolant fluid.

22. The lens assembly of claim 21, wherein said seal is provided on a generally tubular element configured to receive the coolant fluid.

23. The lens assembly of claim 22, wherein said generally tubular element includes a fill port for introducing the coolant fluid into said generally tubular element.

24. The lens assembly of claim 22, wherein said generally tubular element further comprises a flexible bladder.

25. The lens assembly of claim 24, wherein said flexible bladder is formed of a resilient material which expands to accommodate expansion of the coolant fluid when heated by the CRT.

26. The lens assembly of claim 19, further comprising a flange for positioning between the CRT and said CRT coupler, said flange having at least one angled portion configured to set a Scheimpflug angle at which the CRT is adapted to be mounted relative to said longitudinal axis.

27. The lens assembly of claim 26, further comprising first and second seal members positioned on opposite sides of said flange for respective positioning between said CRT coupler and said flange and between said flange and the CRT.

28. The lens assembly of claim 27, wherein said first and second seal members are portions of a seal having a generally U-shaped cross section which receives said flange.

29. The lens assembly of claim 19, wherein said second optical lens element is secured with a clamp plate and threaded fasteners to said CRT coupler.

30. The lens assembly of claim 19, wherein said second optical lens element is secured with a clamp plate and spring clips to said CRT coupler.

31. The lens assembly of claim 19, wherein said CRT coupler includes a fill port for introducing a coolant fluid into a space between said CRT coupler and the CRT.

32. The lens assembly of claim 31, further comprising an expansion bladder communicating with said space, said expansion bladder configured to expand to accommodate expansion of the coolant fluid when the coolant fluid is heated by the CRT.

33. The lens assembly of claim 19, further comprising a clamp plate securing said second optical lens element to said CRT coupler, said clamp plate including a generally rectangular opening adapted to receive light from the CRT and transmit the light in the form of a generally rectangular-shaped image to said first optical lens element.

34. The lens assembly of claim 19, further comprising a plate positioned on an opposite side of said second optical lens element from the CRT, said plate including a generally rectangular opening adapted to receive light from the CRT and transmit the light in the form of a generally rectangular-shaped image to said first optical lens element.

35. The lens assembly of claim 34, wherein said plate is integrally formed with said focus mount and CRT coupler.

36. The lens assembly of claim 19, further comprising a first light stop plate positioned against a first side of said second optical lens element and configured to prevent unwanted light transmission in either direction through said second optical lens element.

37. The lens assembly of claim 36, further comprising a second light stop plate positioned against a second side of said second optical lens element and configured to prevent unwanted light transmission in either direction through said second optical lens element.

38. A lens assembly adapted to be connected to a CRT and affixed to mounting structure in a projection television, the lens assembly comprising:
- a tubular lens mount having a longitudinal axis and at least a first optical lens element mounted therein along the longitudinal axis,
- a tubular focus mount connected to said tubular lens mount and extending along said longitudinal axis;
- a CRT coupler formed integrally with said focus mount, said CRT coupler including CRT fastening structure for securing the CRT thereto and projection television fastening structure for securing said CRT coupler to mounting structure with the projection television;
- a second optical lens element mounted on and sealed against said CRT coupler; and
- a flexible bladder having a first end which is configured to form a seal against the CRT and a second end which forms a seal against said second optical lens element, and further having a space between said first and second ends which is adapted to receive a coolant fluid.

39. The lens assembly of claim 38, further comprising adjustable fastening and locking structure connecting said lens mount to said focus mount and allowing a focus position to be obtained and locked in place between the lens mount and the focus mount.

40. The lens assembly of claim 38, wherein said flexible bladder is formed of a resilient material which expands to accommodate expansion of the coolant fluid when heated by the CRT.

41. The lens assembly of claim 38, further comprising a flange for positioning between the CRT and said CRT coupler, said flange having at least one angled portion configured to set a Scheimpflug angle at which the CRT is adapted to be mounted relative to said longitudinal axis.

42. The lens assembly of claim 38, wherein said flexible bladder includes a fill port for introducing the coolant fluid into said space.

43. A lens assembly adapted to be connected to a CRT and affixed to mounting structure in a projection television, the lens assembly comprising:
- a tubular lens mount having a longitudinal axis and at least a first optical lens element mounted therein along said longitudinal axis,
- a tubular focus mount connected to said tubular lens mount and extending along said longitudinal axis;
- a CRT coupler connected to said focus mount, said CRT coupler including CRT fastening structure for securing the CRT thereto and projection television fastening structure for securing said CRT coupler to mounting structure with the projection television;
- a second optical lens element mounted to said CRT coupler; and
- a flexible bladder having a first end which is configured to form a seal against the CRT and a second end which forms a seal against said second optical lens element, and further having a space between said first and second ends which is adapted to receive a coolant fluid.

44. The lens assembly of claim 43, further comprising adjustable fastening and locking structure connecting said lens mount to said focus mount and allowing a focus position to be obtained and locked in place between the lens mount and the focus mount.

45. The lens assembly of claim 44, wherein said flexible bladder is formed of a resilient material which expands to accommodate expansion of the coolant fluid when heated by the CRT.

46. The lens assembly of claim 44, further comprising a flange for positioning between the CRT and said CRT coupler, said flange having at least one angled portion configured to set a Scheimpflug angle at which the CRT is adapted to be mounted relative to said longitudinal axis.

47. The lens assembly of claim 44, wherein said flexible bladder includes a fill port for introducing the coolant fluid into said space.

48. A lens assembly adapted to be connected to a CRT and affixed to mounting structure in a projection television, the lens assembly comprising:
- a tubular lens mount having a longitudinal axis and at least a first optical lens element mounted therein along said longitudinal axis,
- a tubular focus mount connected to said tubular lens mount and extending along said longitudinal axis;
- a CRT coupler connected to said focus mount, said CRT coupler including CRT fastening structure for securing the CRT thereto and projection television fastening structure for securing said CRT coupler to mounting structure with the projection television;
- a second optical lens element; and
- a clamp plate securing said second optical lens element to said coupler, said clamp plate including a generally rectangular opening adapted to receive light from the CRT and transmit the light in the form of a generally rectangular-shaped image to said first optical lens element.

49. The lens assembly of claim 48, further comprising adjustable fastening and locking structure connecting said lens mount to said focus mount and allowing a focus position to be obtained and locked in place between the lens mount and the focus mount.

50. The lens assembly of claim 49, wherein said generally rectangular opening has a length and a width, and the ratio of the length to the width is one of 4:3 and 16:9.

51. A projection television lens assembly comprising:

a tubular lens mount having a longitudinal axis and at least a first optical lens element mounted therein along said longitudinal axis, a tubular focus mount connected to said tubular lens mount and extending along said longitudinal axis;

a CRT coupler connected with said focus mount, said CRT coupler including CRT fastening structure for securing the CRT thereto and projection television fastening structure for securing said CRT coupler to the mounting structure with the projection television cabinet;

a second optical lens element mounted to said CRT coupler; and a mask having a generally rectangular opening positioned at a location on at least one side of at least one of said first and second optical lens elements and configured to allow the transmission of light through said opening from the CRT.

52. The projection television lens assembly of claim 51, wherein said mask further comprises a coating on said at least one side.

53. The projection television lens assembly of claim 51, wherein said mask further comprises a separate member on said at least one side.

54. A projection television lens assembly comprising:

a tubular lens mount having a longitudinal axis and at least a first optical lens element mounted therein along said longitudinal axis, a tubular focus mount connected to said tubular lens mount and extending along said longitudinal axis;

a CRT coupler connected with said focus mount, said CRT coupler including CRT fastening structure for securing the CRT thereto and projection television fastening structure for securing said CRT coupler to the mounting structure with the projection television cabinet, said CRT coupler having a space with a first registration element; and a second optical lens element mounted to said CRT coupler, said second optical lens element having a second registration element and being configured for receipt in said space such that said first and second registration elements mate together to prevent rotation of said second optical lens element relative to said space.

* * * * *